(12) United States Patent
Babcock et al.

(10) Patent No.: US 6,390,025 B1
(45) Date of Patent: May 21, 2002

(54) LIGHTWEIGHT CAGE

(75) Inventors: William H. Babcock, East Peoria, IL (US); Thomas M. Weidner, Des Moines, IA (US)

(73) Assignee: Habitat Systems, Peoria, IL (US)

( * ) Notice: Subject to any disclaimer, the term of this patent is extended or adjusted under 35 U.S.C. 154(b) by 0 days.

(21) Appl. No.: 09/389,815

(22) Filed: Sep. 3, 1999

(51) Int. Cl.[7] ................................................. A01K 1/02
(52) U.S. Cl. ........................ 119/482; 119/416; 52/127.8
(58) Field of Search ................................. 119/481, 482, 119/416, 417, 452, 419, 496, 473, 472; 52/127.8, 106, 127.6

(56) References Cited

U.S. PATENT DOCUMENTS

| | | | | |
|---|---|---|---|---|
| 3,760,768 A | * | 9/1973 | Patterson | 119/482 |
| 3,830,201 A | * | 8/1974 | Coulbourn | 119/417 |
| 4,869,206 A | * | 9/1989 | Spina | 119/417 |
| 5,010,845 A | * | 4/1991 | Azpurua et al. | 119/452 |
| 5,036,795 A | * | 8/1991 | Houghton | 119/452 |
| 5,247,901 A | * | 9/1993 | Landon et al. | 119/419 |
| 5,251,572 A | * | 10/1993 | Frame et al. | 119/496 |
| 5,571,241 A | * | 11/1996 | Nagata | 119/473 |
| 5,842,439 A | | 12/1998 | Selstad | 119/481 |

\* cited by examiner

Primary Examiner—Charles T. Jordan
Assistant Examiner—Judith A. Nelson
(74) Attorney, Agent, or Firm—Michael Pritzkau; Yorika Morita

(57) ABSTRACT

A lightweight cage is composed of an arrangement of one or more panels that define an enclosed space in which an organism is contained. Each panel includes an inner surface that at least partially define the enclosed space. The panels are made of a surface and urethane insensitive material such that the waste produced by the organism held within the enclosed space will not adhere to the inner surface. In one aspect, each panel may include an inner member defining the inner surface and an outer member fixedly supported spaced from the inner member such that a highly advantageous insulation property is imparted to the panels. In another aspect, a method of fabricating a lightweight cage is described. The panel arrangement is fixedly assembled by chemical fusion to define the enclosed space in which the organism is to be kept.

16 Claims, 7 Drawing Sheets

LIGHTWEIGHT CAGE

BACKGROUND OF THE INVENTION

Cages are used in a variety of situations, such as in a vivarium or in a home, to securely contain a living organism within an enclosed space. A cage for containing reptiles requires special considerations in its construction. Since reptiles are cold blooded, the materials which compose the cage walls should be insulating and/or capable of accommodating additional insulation to protect the organisms contained within from changes in the ambient temperature. A light source and/or heat source, possibly requiring electrical wiring, must be incorporated into the cage in some cases to regulate the temperature within the cage. Plumbing may also be needed to supply water and other necessities into the cage.

An access opening should be included in one of the walls as appropriate to allow the insertion and removal of the reptile into and out of the enclosed space, respectively. The access opening should be arranged such that it may be opened and closed easily. The access opening should also be capable of being locked in the closed position in a way which can be easily unlocked from the outside but is impossible to be unlocked from the inside as certain reptiles have been known to escape from cages with unsecured sliding or hinged access openings. An appropriate locking mechanism should securely hold the reptile within the cage.

The cage should be lightweight yet strong for convenience, portability, and durability. Since there exists a large variety among reptiles in size and shape, the design and fabrication method of the cage should be such that they may be easily adapted to suit the requirements of the particular organism. In addition, the cage should be low in cost.

The inner surfaces of the cage should be easy to clean since the waste produced by reptiles tend to adhere and harden on most materials of which cages are constructed. It is submitted that this is an ongoing, unsolved problem with respect to prior art cages.

An example of a prior art reptile cage is an adaptation of a simple fish aquarium with a metal or plastic mesh or clear acrylic removable top. This exemplary cage is not actually suited for use as a containment for reptiles since fish aquariums are often made of pieces of glass that are held together by adhesives, silicone sealants, and rubber edge seals. These cages therefore tend to be heavy and unwieldy as well as fragile. Glass is also a relatively good conductor of heat, thus it is difficult to insulate the interior temperature of the cage from changes in the ambient temperature. In addition, glass, metal and plastic mesh, and acrylic are all materials onto which reptile wastes easily adhere, and hence can be difficult to clean. Although this type of reptile cage is inexpensive, it is not an ideal solution for the maintenance of a healthy reptile.

A more sophisticated example is given in U.S. Pat. No. 5,842,439 (hereafter the '439 patent) issued to Selstad. The cage according to this patent is constructed with the particular requirements of reptile containment in mind. The particular embodiment described in this prior art patent includes various convenience features such as sliding glass access doors, a bucket recess for receiving a light source, and matching ridges and grooves on the top and bottom, respectively, to aid in the stacking of several cages. There are, however, a number of drawbacks to this prior art cage, as will be described immediately hereinafter.

Some of the major disadvantages arise from the preferred material used to construct the body of the cage. The walls of the reptile cage described in the '439 patent are made of a blow molded, high density polyethylene plastic. Although polyethylene is a strong material which is chemically nonreactive, it is noted that waste produced by organisms contained within the prior art cage will readily adhere to the polyethylene walls and floor of the cage.

The molding process allows the cage to be fabricated effectively of a single sheet of plastic. This feature is desirable in eliminating the need for seams, which can weaken the structural integrity of the cage and add edges and corners that can trap waste and residue. However, this fabrication method is also inflexible in that cages of different shapes and sizes require separate molds. Hence, it is potentially not cost effective to produce cages of more than a few different sizes and shapes. In addition, since the walls of the cage fabricated according to the '439 patent are made of a single layer of thin material approximately one quarter of an inch thick, the interior of the cage is again not very well insulated from changes in the ambient temperature.

The present invention provides a reptile cage which serves to resolve the problems described above with regard to prior art cages in a heretofore unseen and highly advantageous way.

SUMMARY OF THE INVENTION

As will be described in more detail hereinafter, there is disclosed herein a lightweight cage. This cage is composed of an arrangement of one or more panels that define an enclosed space in which an organism is contained. Each panel includes an inner surface that at least partially serves to define the enclosed space. The inner surface is formed from urethane insensitive material such that the waste produced by the organism held within the enclosed space will not adhere to the inner surface.

In one aspect of the invention, each panel may include an inner member defining the inner surface and an outer member fixedly supported spaced from the inner member such that a highly advantageous insulation property is imparted to the panels.

In another aspect of the invention, a method of fabricating a lightweight cage as described above is disclosed. According to the method also described hereinafter, the panel arrangement is fixedly assembled without the use of thermal heating to define the enclosed space in which the organism is to be kept.

DETAILED DESCRIPTION OF THE INVENTION

Figure 1:
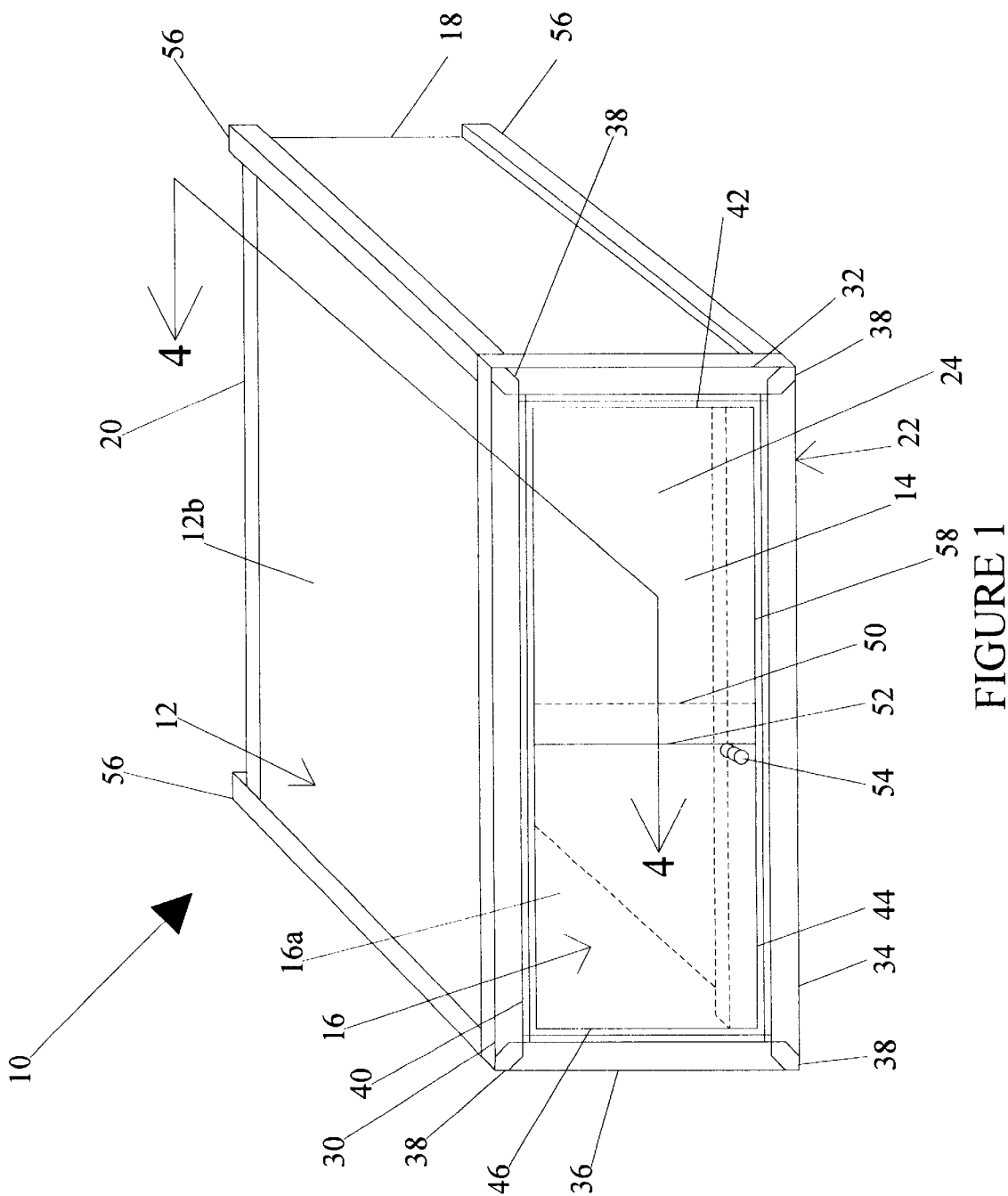
FIG. 1 is a diagrammatic perspective view of a lightweight cage constructed in accordance with the present invention.

Turning now to the drawings, wherein like components are indicated by like reference numbers, attention is immediately directed to FIG. 1, which illustrates one embodiment of a lightweight cage, generally indicated by the reference number 10. Cage 10 in this embodiment is composed of panels 12, 14, 16 and 18, along with a rear panel 20 (not visible) and an access opening assembly 22, which are assembled in accordance with this invention to define an enclosed space 24 in which an organism such as a reptile (not shown) is contained. It is significant to note that panels 12, 14, 16, and 18, along with rear panel 20 and access opening assembly 22 are made of a surface and urethane insensitive material, such as polyvinyl chloride (PVC) as used in the preferred embodiment.

The term "surface insensitive" is understood by those with ordinary skill in the art of materials adhesion to describe a material which is generally non-reactive, such as plastics. In non-reactive materials, there is no ionic movement in the material, hence it is not possible to conjoin two pieces of surface insensitive material under normal circumstances. This property essentially means that ordinary materials cannot adhere to the surface of the particular material being so described. Most common adhesives and sealants, such as epoxies and silicones bead up or are easily rubbed off of surface insensitive materials and hence do not stick lastingly onto the surface of the material. An accelerator material containing a metal, such as copper, must be used in order to glue pieces of surface insensitive material. However, it has been discovered that urethane, contained in urates in urine, organic excrement, and animal waste, can act as an accelerator material. In other words, urethane is reactive with most plastics, including polyethylene plastic used in the '439 patent. Hence, waste produced by organisms will adhere to most surface insensitive materials including plastics.

While the surface insensitivity of PVC is known in the art of materials adhesion, remarkably, it has been discovered that PVC is also insensitive to urethane. It is submitted, therefore, that there is a class of materials which is urethane insensitive, of which PVC is an example. This characteristic is highly advantageous in the construction of a lightweight cage. Specifically, waste produced by an organism cannot adhere to urethane insensitive materials. A cage made of a urethane insensitive material can be easily cleaned since any waste produced will not cake on to the cage walls. In fact, a cage fabricated of a lightweight, high strength, urethane insensitive material with an access opening including a locking mechanism would be ideal for use as a reptile cage.

Another important characteristic of panels 12, 14, 16, and 18 of the embodiment shown in FIG. 1 resides in their being composed of spaced apart inner and outer planar members. Each panel includes a inner planar member, denoted by appending the letter "a" to the appropriate reference number, and a outer planar member, denoted by appending the letter "b" to the appropriate reference number. For example, the inner planar member of panel 16 is designated by the reference number 16a while the outer planar member of panel 12 is denoted by the reference number 12b. Other planar members have not been designated in the present figure for purposes of clarity. In other words, each of panels 12, 14, 16, and 18 defines at least one air pocket within the panel itself, between the inner planar and outer members. This property of panels 12, 14, 16, 18, which will be referred to as "hollow core," will be discussed in more detail in at an appropriate juncture in the discussion below. Rear panel 20 may optionally be made of a material having such a hollow core structure although, in the embodiment shown in FIG. 1, rear panel 20 is made of a single sheet of PVC for convenience. The construction of panel 20 will be further described at an appropriate point in the discussion hereinafter. Access opening assembly 22 may also utilize the hollow core structure.

Still referring to FIG. 1, access opening assembly 22 includes frame members 30, 32, 34, and 36, also of PVC, which are assembled in accordance with this invention in a fashion to form access assembly 22 defining an access opening 37. A series of patches 38, also formed of PVC, are attached, using a method to be discussed at an appropriate point hereinafter, at connective seams between frame members 30, 32, 34, and 36 to add strength to the connective seams. Access opening assembly 22 further includes tracks 40, 42, 44, and 46, each of which defines two grooves (not visible) configured to receive the edges of sliding doors 50 and 52. Sliding doors 50 and 52 are sized such that each door covers substantially one half of access opening 37. Each sliding door is designed to fit into one of the grooves such that it may freely slide along the length of the groove in upper and lower tracks 40 and 44 in a conventional manner. Only one sliding door is fitted into each groove. One of the sliding doors may optionally include a locking mechanism 54 which, when placed in its locking position, prevents sliding doors 50 and 52 from moving with respect to one another, thus effectively closing access opening 37.

Any of panels 12, 14, 16, and 18; access opening assembly 20; and rear panel 22 may define additional access openings for providing ventilation, drainage, and for other purposes. Sliding doors 50 and 52 and tracks 40, 42, 44, and 46 may equivalently be replaced with a hinged door assembly (not shown) which may be fabricated of PVC material. The hinged door assembly can include one or more transparent or opaque doors attached to cage 10 using hinges or other means such that hinged door assembly may be positioned in an open or closed configuration thus providing adjustable access through access opening 37. The lengthwise connective seams between panels 12, 14, 16, and 18 are covered with a series of edge covers 56 (three of which are visible) to add strength to the lengthwise connective seams and for aesthetic reasons. A litter dam 58 is placed directly behind panel 22 to prevent wash back of debris and waste into the grooves and onto the sliding doors.

Figure 2:
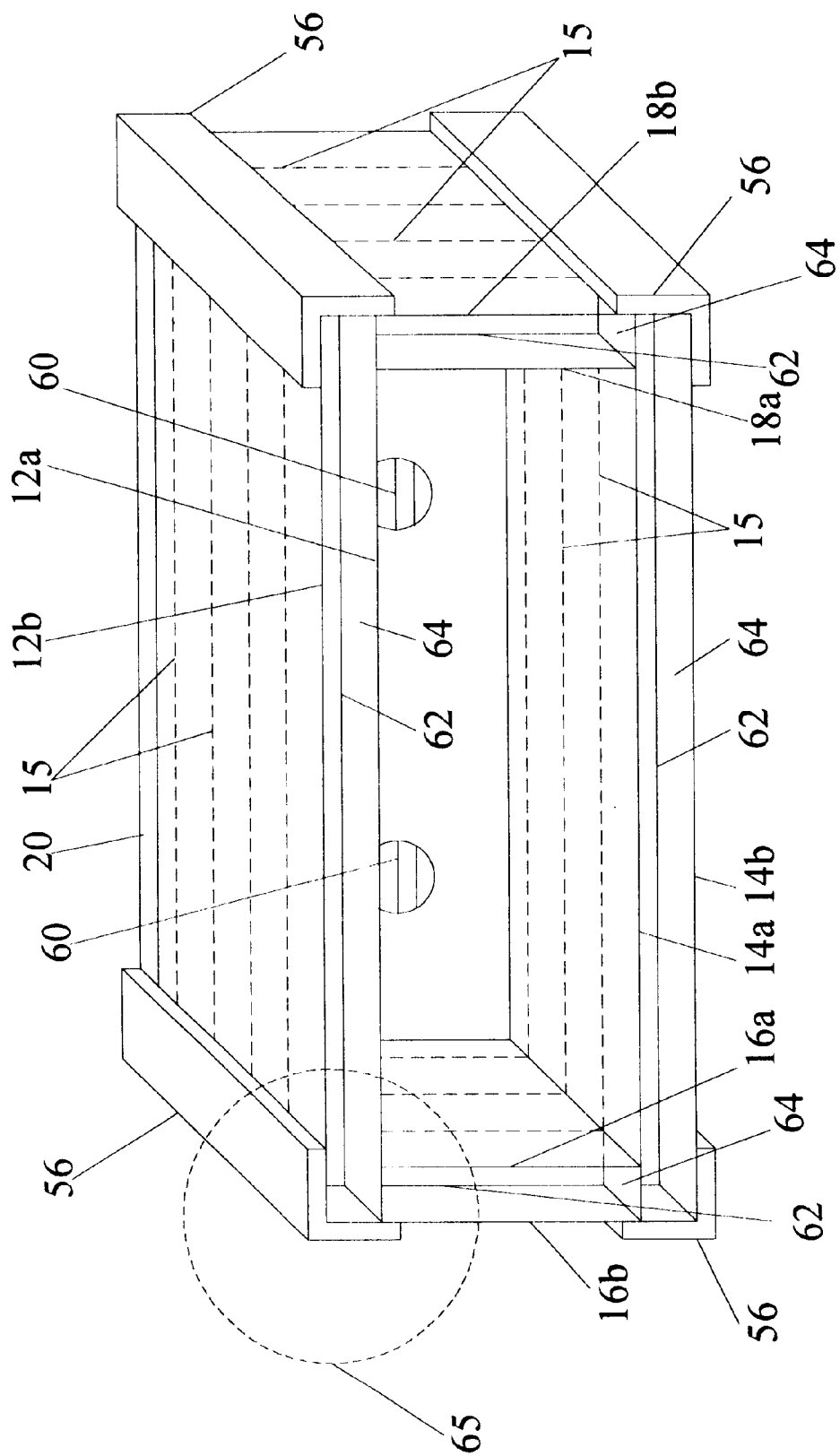
FIG. 2 is a diagrammatic cut away view in perspective of the cage of FIG. 1 with a front portion of the cage cut away.

FIG. 2 shows optional air vents 60 fitted into rear panel 20. The exact configuration of air vents 60 as well as other access openings may be customized for the specific requirements of the organism to be contained within cage 10. The construction of panels 12, 14, 16, and 18 includes inner and outer planar members 12a,b, 14a,b, 16a,b, and 18a,b, respectively. These inner and outer planar members include a plurality of ribs 62 throughout the panels which separate hollow air pockets 64. Ribs 62 and air pockets 64 are visible in the front cut away portions of panels 12, 14, 16, and 18 as shown in FIG. 2. The direction of ribs 62 within panels 12, 14, 16, and 18 are shown by dashed lines 15. The presence of air pockets 64 characterize the panels as "hollow core," in other words materials containing hollow spaces within its construction. Panels 12, 14, 16 and 18 are conjoined at points of contact using a method to be described in detail below.

Figure 3:
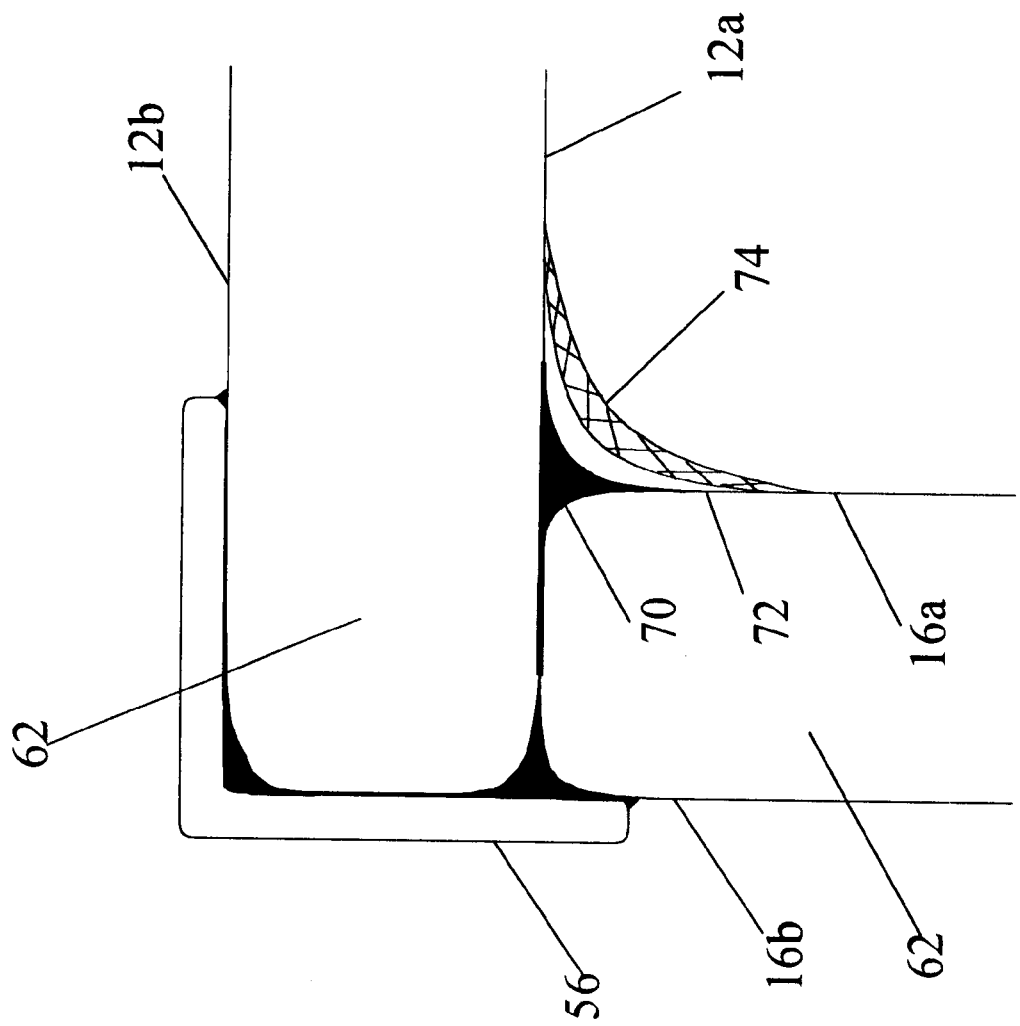
FIG. 3 is an enlarged view of a portion of the view shown FIG. 2, shown here to illustrate details of the construction of a corner of the cage.

Attention is now directed to FIG. 3, in conjunction with FIG. 2, which shows an enlarged view of a corner portion of cage 10 within a dashed line 65 in FIG. 2. The details of the assembly of panels 12 and 16 can be seen along with details of the construction of the panels themselves. Panel 12 is seen to be composed of its inner planar member 12a and its outer planar member 12b, fixedly separated by ribs 62. Each rib 62 of panel 12 runs the length of the panel in the plane parallel to the drawing surface. As noted, ribs 62, inner planar member 12a, and outer planar member 12b define air pockets 64 (not visible in FIG. 3) throughout panel 12. As described in earlier, the lengthwise connective seam between panels 12 and 16 is covered with edge cover 56 as shown.

It should be emphasized that it has been discovered in accordance with the present invention that the surface and urethane insensitivity of PVC makes the material ideal for use in a reptile cage for which ease of cleaning is an essential factor. Almost nothing reacts with the surface of a surface insensitive material. In addition even urethane containing materials, such as waste produced by reptiles, will not react and stick to the surface of a urethane insensitive material such as PVC. Panels 12, 14, 16 and 18 and rear panel 20 are composed of extruded PVC material that has been cut to the desired dimensions of cage 10. In the embodiment described herein, panels 12, 14, 16 and 18 are made of hollow core PVC. Such extruded PVC panels are low cost, strong, stable, lightweight, and can be cut or drilled to meet the specifications of the user. The hollow core construction enhances the strength and insulation properties of panels 12, 14, 16 and 18, and allows easy routing of plumbing and wiring (not shown) within the panels through air pockets 64. Additional insulation materials (not shown) such as, for example, fiberglass insulation may be added in the air pockets to further improve the insulation capacity of panels 12, 14, 16 and/or 18 as needed.

Continuing to refer to FIG. 3, while the fact that PVC is surface and urethane insensitive makes it an attractive material for use in a reptile cage, it is also difficult to conjoin pieces of PVC together since even most adhesives do not stick to the urethane insensitive PVC. Thicker pieces of PVC (i.e., with thickness of one quarter inch or more) are normally welded together at high temperatures. However, with lightweight, hollow core panels such as panel 12, the thickness of ribs 62, inner member 12a, and outer member 12b is each less than one eighth inch. Hence, the hollow core panels tend to melt and warp at welding temperatures, and it has not been heretofore possible to securely weld pieces of hollow core PVC material together into a useful construction, such as a box or a cage. A highly advantageous method of conjoining pieces of PVC, which is used extensively in the reptile cage constructed in accordance with this invention, will be described in detail immediately hereinafter.

Still referring to FIG. 3, the mechanism by which panels 12 and 16 are conjoined according to the present invention is examined in detail. Panels 12 and 16 are first held together in a jig (not shown) then fused using a manually applied, chemical solvent. The chemical solvent utilized in the preferred embodiment is Polyco Adhesive UN#1133, but any suitable substitution may be used. The same solvent weld step is used to attach edge cover 56 to the lengthwise connective seam. A layer of fused material 70 results from the solvent weld step as shown.

The solvent weld step alone is not sufficient to securely hold the panels together. Since the chemical solvent further dissolves and fuses the PVC material with each additional application, repeated use of the chemical solvent will not result in a build up of solid skin layers capable of supporting the panels and the solvent penetration depth is limited. Hence additional steps are necessary to fill the voids and spaces created by the solvent weld process whereby to add strength to the connection.

The next step in the panel conjoining procedure is the application of a filler material using an applicator such as a caulking gun or a syringe. The filler material, for example Eclectic Products E6100 Adhesive as used in this particular embodiment, serves to fill the gaps and spaces created in the solvent weld step. The filler material contains accelerators which actually allows it to adhere to fused material layer 70 resulting from the chemical solvent weld, as shown schematically in FIG. 3 as a filler layer 72, as well as the surrounding PVC surfaces. Filler layer 72 itself can be, for example, painted and sealed with materials which would not normally adhere to the PVC surface.

It is noted that it is possible to conjoin the panels using the filler material alone since the filler material does adhere to the PVC surface. However, the setting time of the filler material is significantly longer than the fusing time of the chemical solvent (on the order of a few hours versus a few minutes). Therefore, it is advantageous to use the filler material only as a supportive material to add strength to fused material layer 70 rather than as the actual conjoining material.

The final step in the procedure is the application of a silicone cap layer 74 to further protect fused material layer 70, again using an applicator such as a caulking gun or a syringe. The present embodiment uses Nuco Nuflex 333 Aquarium sealant, but any suitable, animal safe sealant material may be substituted in its place. Thus, through this three step procedure, a lightweight cage with superior insulation properties can be constructed using panels of surface and urethane insensitive, hollow core PVC. Since this three step procedure can be applied to PVC panels of any size and thickness, it is easy and cost effective to vary the dimensions of the cage by simply cutting panels 12, 14, 16, and 18, rear panel 20, and access opening assembly 22 to the size required then conjoining the components using the three step procedure. To further strengthen the connective seams, edge pieces 56 are added along the connective seams using the same three step procedure.

Figure 4:
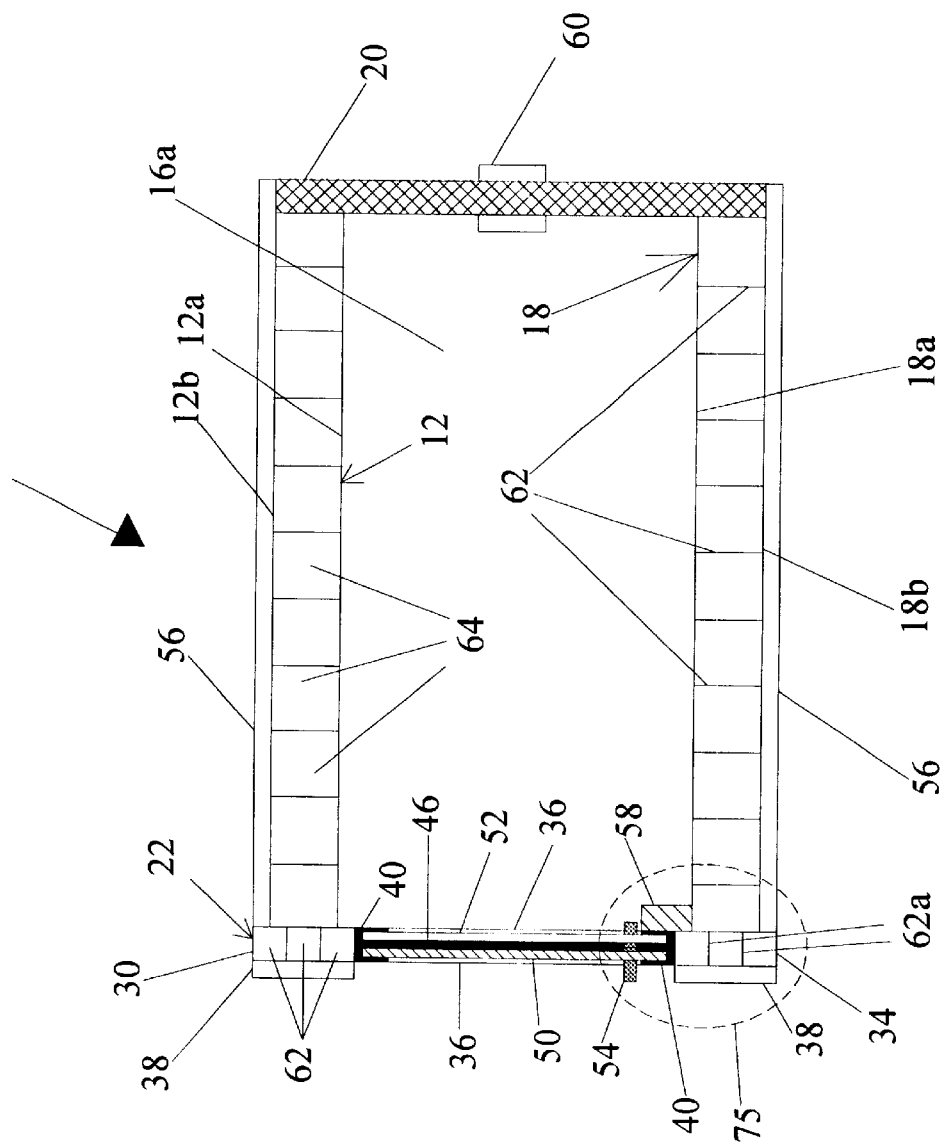
FIG. 4 is a cross sectional view in elevation of the cage of FIG. 1 shown here illustrate the details of construction.

Referring now to FIG. 4, which is a cross sectional view of cage 10, it is noted that ribs 62 within panels 12 and 14 run along a plane perpendicular to the drawing surface. As mentioned, rear panel 20 is formed of a single, solid sheet of PVC for convenience since it is easier to place optional openings, such as air vents 60, into solid sheet of PVC rather than in hollow core PVC panels. However, a hollow core PVC panel may optionally be used as rear panel 20 in cases such as when extra insulation is desired, including provisions for such optional openings.

Attention is now directed to details relating to access opening assembly 22 as shown in FIG.4. As mentioned earlier in the context of FIG. 1, access opening assembly 22 includes frame members 30, 32 (not shown), 34, and 36 of PVC that have been assembled in a frame like manner using the PVC joining method according to this invention. Hollow core PVC is used for the frame members in this embodiment as shown in FIG. 4 as is exemplified by the cross sectional view of frame members 30 and 34 showing ribs 62a. The hollow core PVC structure of panels 12 and 18 are also visible in FIG. 4 as ribs 62 and air pockets 64 can be seen separating inner and outer planar members 12a and 12b in panel 12, and 18a and 18b in panel 18, respectively. The thickness of frame members 30 and 34 (i.e., the distance between the inner and outer planar members) is smaller than the thickness of panels 12, 14, 16, and 18, also formed of hollow core PVC, in order to better accommodate tracks 40, 42 (not shown), 44, and 46 in which sliding doors 50 and 52 will run.

Figure 5B:
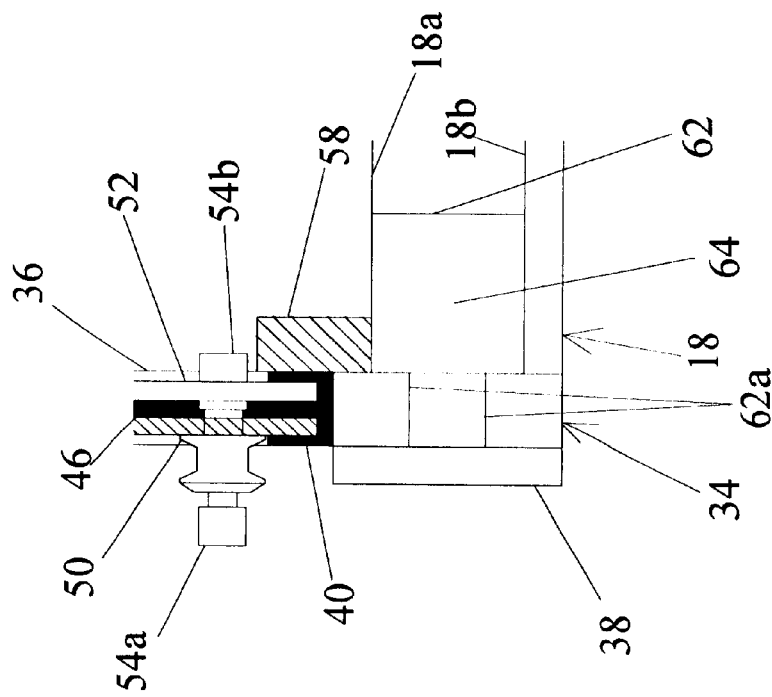
FIG. 5b is the enlarged view of FIG. 5a, shown here to illustrate details of the coupling relationship of the locking mechanism used in the cage.
Figure 5A:
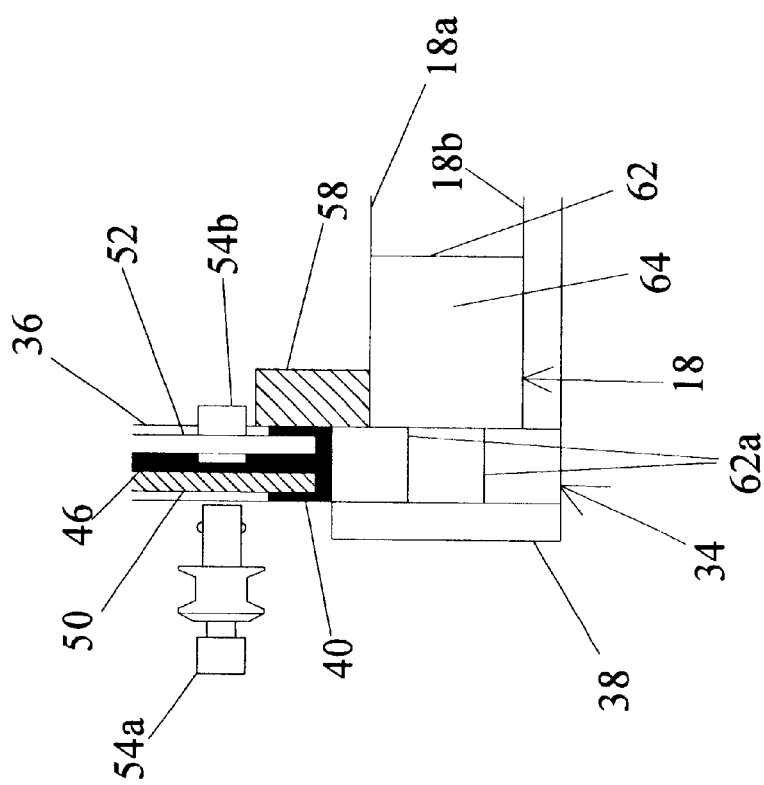
FIG. 5a is an enlarged portion of the cross sectional view shown in FIG. 4, shown here to illustrate further details including the components of a locking mechanism used in the cage.
Figure 5C:
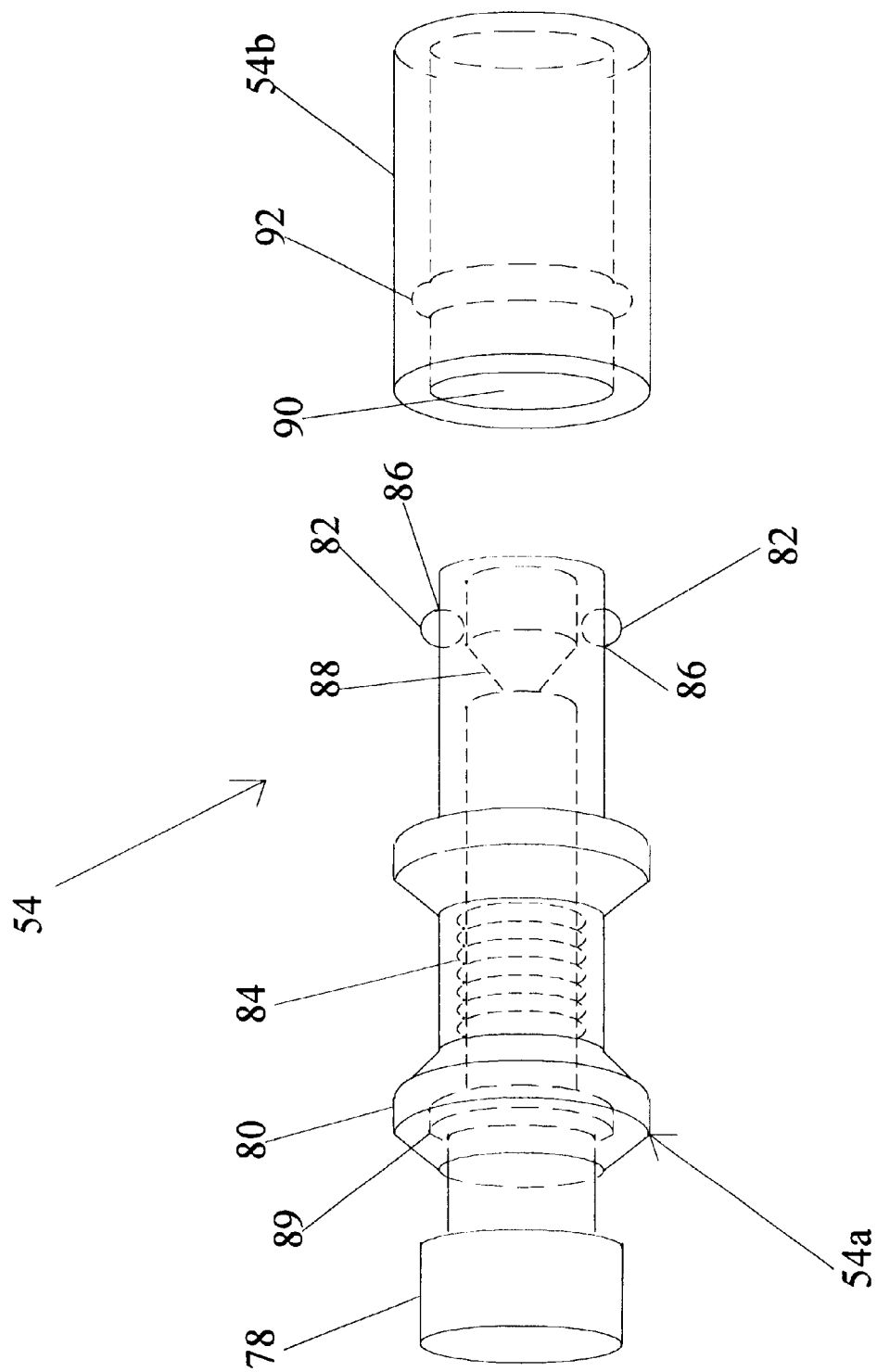
FIG. 5c is a diagrammatic perspective view of the locking mechanism used in the cage, shown here to illustrate details of the components of the locking mechanism.

Details of locking mechanism 54 are explained using FIGS. 5a through 5c, in conjunction with FIG. 4. Note again that the hollow core structure of frame member 34 and panel 18 are evidenced by the presence of ribs 62a in frame member 34 and rib 62 and air pocket 64. FIG. 5a is an enlarged view of the area within a dashed line 75 in FIG. 4 with locking mechanism 54 shown in its unlocked or open position. Locking mechanism 54 is composed of a removable pushpin stop 54a, which is approximately one half inch in diameter at its widest part and one inch in length, and a sleeve 54b positioned within sliding door 52 that is designed to matingly receive pushpin stop 54a. To unlock locking mechanism 54, pushpin stop 54a is removed from sleeve 54b. Sleeve 54b is positioned within sliding door 52 such that sliding door 50 is able to move freely with respect to sliding door 52 within track 44 when pushpin stop 54a is removed from sleeve 54b. Hence, with locking mechanism 54 in the open position as such, enclosed space 24 can readily be accessed.

In FIG. 5b, which is an enlarged view of locking mechanism 54 in its closed position, taken within dashed line 75 of FIG. 4, pushpin stop 54a fits into sleeve 54b. In this case, pushpin stop 54a prohibits movement of sliding door 50 with respect to sliding door 52. Hence, the positions of sliding doors 50 and 52 are locked in place and enclosed space 24 cannot be accessed from outside cage 10.

Details of pushpin stop 54a and sleeve 54b are shown in FIG. 5c. Pushpin stop 54a includes a spring loaded plunger 78 enclosed within receptacle 80. Also included within pushpin stop 54a are a pair of ball bearings 82 and a coil spring 84. The ball bearings are received in a pair of openings 86 defined in receptacle 80. Plunger 78 includes a groove 88 designed to partially accommodate ball bearings 82 when plunger 78 is pushed in to an "in" position. Coil spring 84 serves to resiliently bias spring loaded plunger 78 such that the normal position of plunger 78 is an "out" position where groove 88 does not match up with openings 86. Therefore, in the "out" position, the ball bearings are biased to protrude from openings 86. Plunger 78 also includes stopper 89 which prevents plunger 78 from being removed from receptacle 80. Plunger 78 including ball bearings 82 is designed to be inserted into sleeve 54b through a hole 90 with plunger 78 depressed in receptacle 80 such that ball bearings 82 are receivable in receptacle groove 92. At the same time, hole 90 is sized such that pushpin stop 54a cannot be inserted into hole 90 when plunger 78 is in the "out" position. Hence, in order to place pushpin stop 54a within sleeve 54b, plunger 78 must be depressed manually into the "in" position such that ball bearings 82 are retractable into groove 88. Once fitted into sleeve 54b through hole 90, plunger 78 is released such that ball bearings 82 are biased outwardly by plunger 78 and protrude to matingly fit into receptacle groove 92 and so pushpin stop 54a cannot be removed from sleeve 54b. Conversely, plunger 78 must be depressed into the "in" position to remove pushpin stop 54a from sleeve 54b to unlock the locking mechanism.

Sleeve 54b is affixed in sliding door 52 such that, when pushpin stop 54a is placed in sleeve 54b through hole 90, pushpin stop 54a blocks sliding door 50 from moving with respect to sliding door 52 within tracks 40, 42, 44, and 46. Receptacle groove 92 within sleeve 54b matingly accommodates ball bearings 82 within receptacle 80 in such a way that pushpin stop 54a cooperates with sleeve 54b to lock the positions of the sliding doors with respect to each other, thus prohibiting access into enclosure 24.

Locking mechanism 54 as described above is advantageous in the context of the present invention because it can easily be locked or unlocked using just one hand. Also, the dimensions of pushpin stop 54a and sleeve 54b are relatively small (pushpin stop 54a is approximately three eighths inch in diameter at the largest point and one inch in length; sleeve 54b is approximately three eighths inch in diameter and five eighths inch in length) with respect to the overall size of the cage. It is noted that the locking mechanism should be made from rust proof materials such as, for example, aluminum whenever possible. Moreover, the dimensions of the locking mechanism may reflect a particular application. That is, a larger cage may require a larger locking mechanism.

Figure 6:
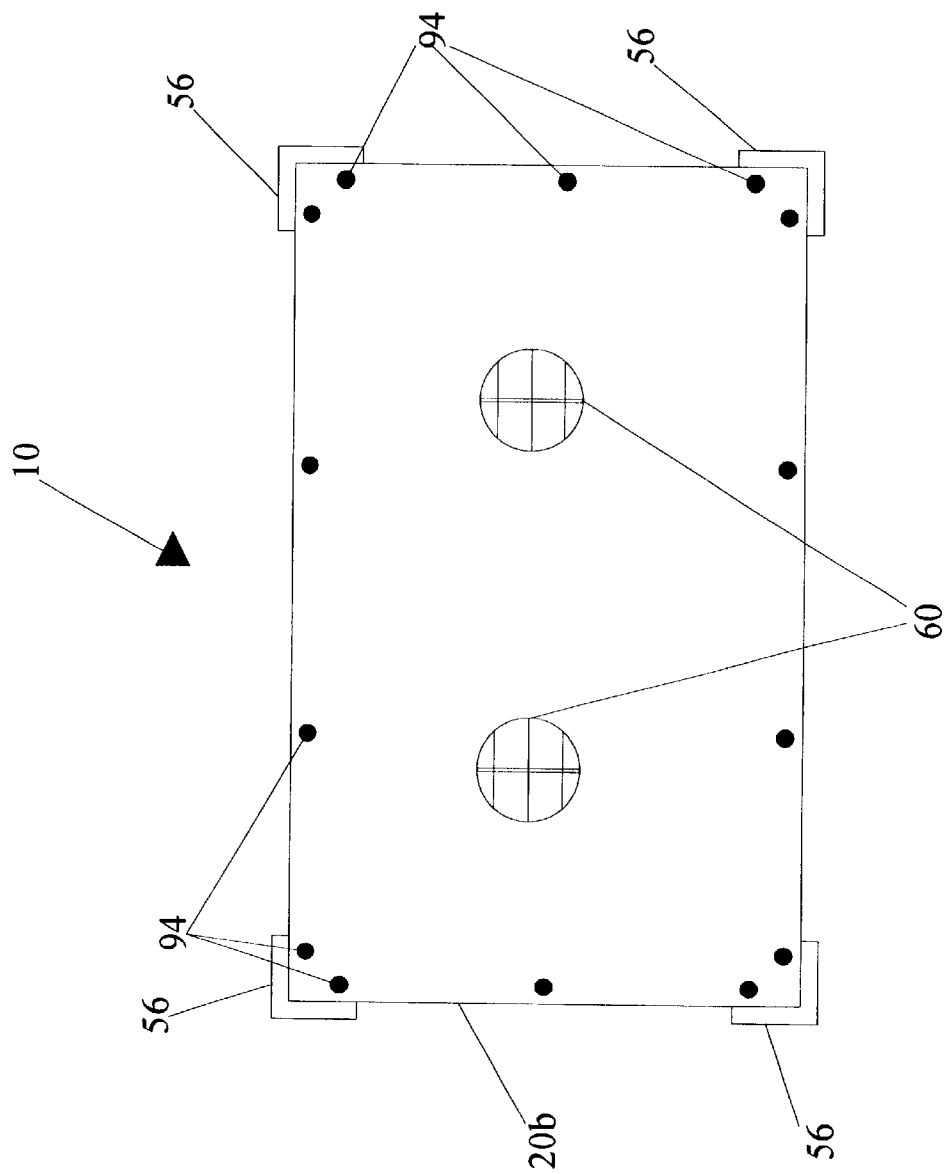
FIG. 6 is a rear view in elevation of the cage.

Turning now to FIG. 6, which shows the reptile cage of FIG. 1 in elevation from the rear, it is noted that, in this embodiment of the invention, rear panel 20 may be secured onto panels 12, 14, 16, and 18 using rivets 94 in addition to the PVC joining method. As noted earlier, rear panel 20 in this embodiment of the invention is made of a solid sheet of PVC which is thicker than the thickness of inner and outer members used in the hollow core structure described earlier. This feature allows additional access openings to be easily drilled into rear panel 20 as desired, providing ready access to external sources of heat, ventilation, etc., without compromising the strength or the insulating properties of the hollow core panels. Alternatively, it should be appreciated that rear panel 20 may be replaced with a hollow core panel, if so desired. Moreover, access opening assembly 22 can be replaced with a hollow core PVC panel defining a relatively small entrance fitted with an appropriately sized door that may be transparent or opaque and may itself provide insulation for interior space 24.

The disclosed reptile cage combines the advantage of a strong, lightweight, reptile containment system with the advantage of providing a urethane insensitive and well insulated cage whose design is easily customizable and cost effective. Since the lightweight, reptile cage and associated method disclosed herein may be provided in a variety of different configurations and the method may be practiced in a variety of different ways, it should be understood that the present invention may be embodied in many other specific ways without departing from the spirit or scope of the invention. Therefore, the present examples and methods are to be considered as illustrative and not restrictive, and the invention is not to be limited to the details given herein, but may be modified within the scope of the appended claims.

What is claimed is:

1. A cage comprising:
   an arrangement of one or more panels defining an enclosed space, each of said panels including an inner surface that at least partially serves to define said enclosed space, which inner surface is formed from a urethane insensitive material, wherein the inner surface of each one of said panels is conjoined, at least in part, by chemical fusing to the inner surface of at least one of said panels.

2. The cage according to claim 1 wherein said inner surface is composed of polyvinyl chloride (PVC).

3. The cage according to claim 1 wherein said panels are composed of polyvinyl chloride (PVC).

4. The cage according to claim 1 wherein each of said panels includes an inner member defining said inner surface and a planar outer member which inner and outer members are spaced apart and fixedly supported relative to one another.

5. The cage according to claim 4 wherein each of said panels is fabricated separately and then the inner surface of each one of said panels are conjoined, at least in part, by chemical fusing to the inner surface of at least one of said panels to define said enclosed space.

6. The cage according to claim 4 wherein said inner and outer members are fixedly supported relative to one another by a plurality of cross members extending between the inner and outer members, said inner member, outer member and plurality of cross members being configured to cooperatively define at least one air pocket therebetween.

7. The cage according to claim 1 wherein at least one of said panels includes access means defining an access opening through which said enclosed space may be accessed from outside the cage.

8. The cage according to claim 7 wherein said access means includes at least one door positioned in said access opening adjustably configurable between open and closed positions such that access to said enclosed space is provided in the open position and said access opening is closed in the closed position.

9. The cage according to claim 7 wherein a pair of sliding doors are positioned in said access opening selectively movable between open and closed positions such that access to said enclosed space is provided in the open position and the access opening is closed in the closed position.

10. The cage according to claim 7 wherein said access means includes at least one door, attached to the cage by a hinge arrangement such that the door is selectively movable between open and closed positions for which access to said enclosed space is provided in the open position and the access opening is closed in the closed position.

11. The cage according to claim 7 wherein said access means includes two doors slidable with respect to one another defining an alignable through opening and a locking mechanism which selectably fixes said doors in the closed position using the alignable through opening.

12. The cage according to claim 11 wherein said locking mechanism includes a combination of a removable pushpin stop and a sleeve designed to receive said removable pushpin stop wherein said removable pushpin stop includes a pair of ball bearings selectively receivable by the sleeve to selectively lock the removable pushpin stop to the sleeve in a way which fixes the doors relative to one another when the pushpin stop and the sleeve are mated through the alignable through opening.

13. In a cage for containing at least one living organism, the improvement comprising:

an arrangement of one or more panels defining an enclosed space, each of said panels including an inner surface that at least partially serves to define said enclosed space, which inner surface is formed from a urethane insensitive material, wherein the inner surface of each one of said panels is conjoined, at least in part, by chemical fusing to the inner surface of at least one of said panels to at least partially define said enclosed space.

14. The improvement according to claim 13 wherein said urethane insensitive material is polyvinyl chloride (PVC).

15. The improvement according to claim 13 wherein each of said panels includes an inner member defining said inner surface and an outer member which inner and outer members are spaced apart and fixedly supported relative to one another.

16. A cage comprising:

an arrangement of one or more panels defining an enclosed space, each of said panels including an inner surface that at least partially serves to define said enclosed space, each of said panels further including an inner member defining said inner surface and a planar outer member, which inner and outer members are spaced apart and fixedly supported relative to one another by a plurality of cross members extending between the inner and outer members, wherein said inner member, outer members and plurality of cross members are configured to cooperatively define at least one air pocket therebetween.

* * * * *